United States Patent
Colosso

(10) Patent No.: US 6,169,976 B1
(45) Date of Patent: *Jan. 2, 2001

(54) METHOD AND APPARATUS FOR REGULATING THE USE OF LICENSED PRODUCTS

(75) Inventor: Juan Carlos Colosso, Santa Clara, CA (US)

(73) Assignee: enCommerce, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/109,608

(22) Filed: Jul. 2, 1998

(51) Int. Cl.[7] .................................................. G05F 17/60
(52) U.S. Cl. ............................... 705/59; 705/51; 705/55; 705/56; 705/58
(58) Field of Search ................................ 380/4; 705/51, 705/55, 56, 59

(56) References Cited

U.S. PATENT DOCUMENTS

| | | | |
|---|---|---|---|
| 5,337,357 | * | 8/1994 | Chou et al. ........................ 380/4 |
| 5,553,143 | * | 9/1996 | Ross et al. ........................ 380/25 |
| 5,754,864 | * | 5/1998 | Hill ................................ 395/712 |
| 5,758,068 | * | 5/1998 | Brandt et al. ................... 395/186 |
| 5,790,664 | * | 8/1998 | Coley et al. ..................... 380/4 |
| 5,864,620 | * | 1/1999 | Pettitt ............................ 380/4 |
| 5,893,910 | * | 4/1999 | Martineau et al. .............. 707/10 |
| 5,898,780 | * | 4/1999 | Liu et al. ........................ 380/25 |
| 5,905,860 | * | 5/1999 | Olsen et al. ................... 395/187.01 |
| 5,940,504 | * | 11/1999 | Griswold ........................ 705/59 |
| 5,982,889 | * | 11/1999 | DeMont .......................... 705/59 |

FOREIGN PATENT DOCUMENTS

WO 99/26123 * 5/1999 (WO) ........................ G06F 1/00

OTHER PUBLICATIONS

Novell Launches Innovative Channel Distribution Program, PR Newswire, p317LAM026, Mar. 17, 1997.*
Elan Computer Group Announces Availability of License Express 2.0, Business Wire, p10010174, Oct. 1, 1997.*
Rainbow Showcases Expanded Sentinel Suite at COMDEX SPRING '98, Business Wire, Apr. 20, 1998.*

* cited by examiner

Primary Examiner—James R. Trammell
Assistant Examiner—Chang Y. Chung
(74) Attorney, Agent, or Firm—Hickman Palermo Truong & Becker LLP; Carl I. Brandt

(57) ABSTRACT

In one aspect, a method for activating, installing, and regulating use of a licensed product is disclosed. A customer licenses or buys a licensed product from a distributor. The distributor registers information describing the customer, the licensed product, and other information about the transaction at a database maintained by the licensor, manufacturer, or developer of the licensed product. The licensor communicates information describing the transaction to the customer, and the distributor ships media containing the licensed product to the customer. The customer connects to the database through a server and requests the licensed product to be activated, providing the information that describes the transaction in its request. In response, the server of the licensor generates encrypted key information that uniquely identifies the customer, the licensed product, and a license level or other information about the maximum permitted extent of use of the licensed product. The customer installs the licensed product and provides the key information during the installation process. The licensed product is then executed and the appropriate license level is enforced based on the key information.

21 Claims, 10 Drawing Sheets

PRODUCT SERIAL NUMBER 400

| 402 | 404 |
|---|---|
| CompanyA. com | 5 0 0 0 |

*Fig. 4*

METHOD AND APPARATUS FOR REGULATING THE USE OF LICENSED PRODUCTS

FIELD OF THE INVENTION

The present invention generally relates to installing, registering, or activating licensed computer products, such as software products. The invention relates more specifically to installing, registering, activating and regulating licensed software products by having license terms that are enforced during installation, registration, activation and continues operation.

BACKGROUND OF THE INVENTION

An explosion in the creation, production, and distribution of licensed products is occurring. In this context, "licensed product" refers to a product in which the manufacturer, producer or distributor transfers certain intangible rights in the product to the consumer. Examples of licensed products are computer software, computer games, and musical works.

Such products are licensed to the consumer or end user, rather than sold, for several different reasons. In most cases, licensed products are easily reproducible using computers or digital equipment. In addition, often the manufacturer, producer or distributor charges a license fee to each user or for each copy of the product. Accordingly, the manufacturer, producer or director needs to control when and how the product is copied, to prevent unauthorized use or reproduction of the product.

Further, when the license fee charged by the manufacturer, producer, or distributor is tied to the number of authorized users or clients of the licensed product, there is potentially an infinite number of stock numbers or part numbers that can be assigned to the product. For example, using a slavish scheme, the manufacturer or producer of a licensed product could assign a different stock number for each number of authorized users or clients (part number 202 represents Product X with 200 authorized users, number 204 represents Product X with 500 users, etc.). Such schemes rapidly become unwieldy.

These schemes can also create planning problems. Some licensed products that are offered at different (license levels) are delivered with identical operational code. Thus, when the end user receives tangible media for the product, the same media is delivered to customers who are authorized to use the product with 100 users or 10,000 users. In some cases, the distributor determines the number of authorized users at the time of sale, long after the media has been shipped from the manufacturer to the distributor. In all these cases, there is a need to permit use of the product only for the number of users that are authorized and for whom license fees are paid.

Further, predicting demand for a particular part number is usually difficult, if not impossible for the manufacturer, producer or distributor.

Several past approaches have addressed these problems. For example, there are a variety of copy protection mechanisms that prevent a licensed product from being copied at all, or prevent the product from being copied more than once. Although once popular, copy protection mechanisms have gone out of favor, because many end users have learned how to defeat them. And for other end users, they are a nuisance.

Some software products require the use of a license key to unlock and activate the product. However, in some markets, customers view license keys as problematic and annoying. Large institutional customers, for example, often have thousands of users who are using many different licensed products in their internal operations. In such a scenario, preventing loss or disclosure of numerous license keys is a serious problem.

Other problems arise from the characteristics of the parties involved in distributing licensed products. For some licensed products, such as computer software, it is common for the product to reach end users through a distributor or retailer who is not affiliated with the manufacturer or developer. From the distributor's perspective, customers are a critical asset, and information that identifies customers is considered highly confidential. Such distributors do not wish to disclose the identity of their customers to the software manufacturer or developer.

Based on the foregoing, there is a clear need to have a licensing manager mechanism to regulate the reproduction of a licensed product.

There is also a need to provide a licensing manager mechanism that can be used by a customer or distributor in an anonymous manner.

There is also a need to provide a licensing manager mechanism that is easy to use and convenient to use, especially when the product is distributed to end users by distributors who are not intimately familiar with the product.

There is also a need to provide such a licensing manager mechanism that supports one part number for the licensed product, or a small number of part numbers, so that the number of different products in inventory is minimized.

SUMMARY OF THE INVENTION

The foregoing needs and objectives, and other needs and objectives that will become apparent from the following description, are fulfilled and achieved by the present invention, which comprises, in one aspect, a method for regulating use of a licensed product, comprising the steps of registering a sale of the licensed product by storing sales information, in which the sales information uniquely identifies a customer and the licensed product licensed thereto; generating access information uniquely associated with the customer and the sales information; in response to receiving a request from the customer to activate the licensed product, in which the request contains the access information, generating key information based on the sales information, in which the key information comprises an encrypted representation of information identifying the customer, and the licensed product licensed thereto; and allowing the customer to use the licensed product only when the customer provides key information matching the sales information.

One feature of this aspect is that the step of allowing the customer to use the licensed product comprises the step of allowing the customer to install and use the licensed product only when the customer provides key information matching the sales information. In another feature, the step of registering a sale includes the step of storing the sales information in a server in a network, and further including the step of communicating the key information over the network to the customer at a location remote from the server.

Another feature is that the step of registering a sale includes the step of storing the sales information in a server in a network, and further including the step -5of communicating the access information over the network. Yet another feature is that the step of generating the key information further includes the step of verifying that the access information matches the sales information.

According to another feature, the step of registering the sale of the licensed product includes the steps of receiving the sales information over a network at a web application program of a web server remote from the customer; in response to receiving the sales information, generating access information based on the sales information using the web application program; creating a client account in a database of the web server based on the sales information; and storing at least a portion of the access information in the client account. A related feature is that the step of generating access information includes the steps of generating a product serial number based on the sales information; and generating a login identifier, wherein the login identifier is used by the customer to connect to the web application over the network.

Another related feature is that the step of generating a login identifier includes the steps of generating a user identifier that is based on a root domain name of a client associated with the customer; and generating a password; in which a combination of the user identifier and password is used by the client to connect to the web application over the network. Yet another related feature is that the step of generating a product serial number includes the step of generating a product serial number that contains information representing a root domain name associated with the client. Still another related feature is that the step of generating a product serial number includes the step of generating a product serial number that contains information representing a license characteristic. According to another feature, the step of generating a product serial number includes the step of generating a product serial number that defines a maximum number of concurrent users of the licensed product.

In another feature, the step of communicating access information over the network system includes the step of sending a unique user identifier to a client associated with the customer over the network; and sending a unique password to the client, in which the user identifier and password are used by the customer to connect to a web application running on a web server remote from the customer and in which the sales information is stored. A related feature is that the step of sending the access information over the network includes the step of sending a unique product serial number to a client associated with the customer over the network, in which the product serial number contains a representation of a root domain name associated with the client.

In another feature, the step of receiving a request to activate the licensed product includes the steps of receiving a login identifier from a client that is based on the access information; receiving a product serial number from the client; when the login identifier is valid, connecting the client to an application program that generates the key information. In still another feature, the step of generating the key information includes the steps of generating an encrypted installation key as part of the key information, in which the installation key comprises information for regulating installation of the licensed product; and generating an encrypted activation key as part of the key information, in which the activation key comprises information for regulating use of the licensed product. A related feature is that the step of generating an encrypted installation key includes the step of generating an encrypted installation key that contains a representation of information identifying the licensed product. Still another related feature is that the step of generating an encrypted activation key includes the step of generating an encrypted activation key that contains a representation of a license level, in which the license level represents a restriction on allowed users of the licensed product.

In another feature, the step of communicating the key information includes the step of sending the key information to the customer in an electronic mail message. In a related feature, the step of communicating the key information to the customer includes the step of displaying the key information on a client interface.

Other aspects and features will become apparent from the following specification and claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a unique product serial number;

DETAILED DESCRIPTION OF THE PREFERRED EMBODIMENT

A method and apparatus for providing a licensing manager mechanism is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
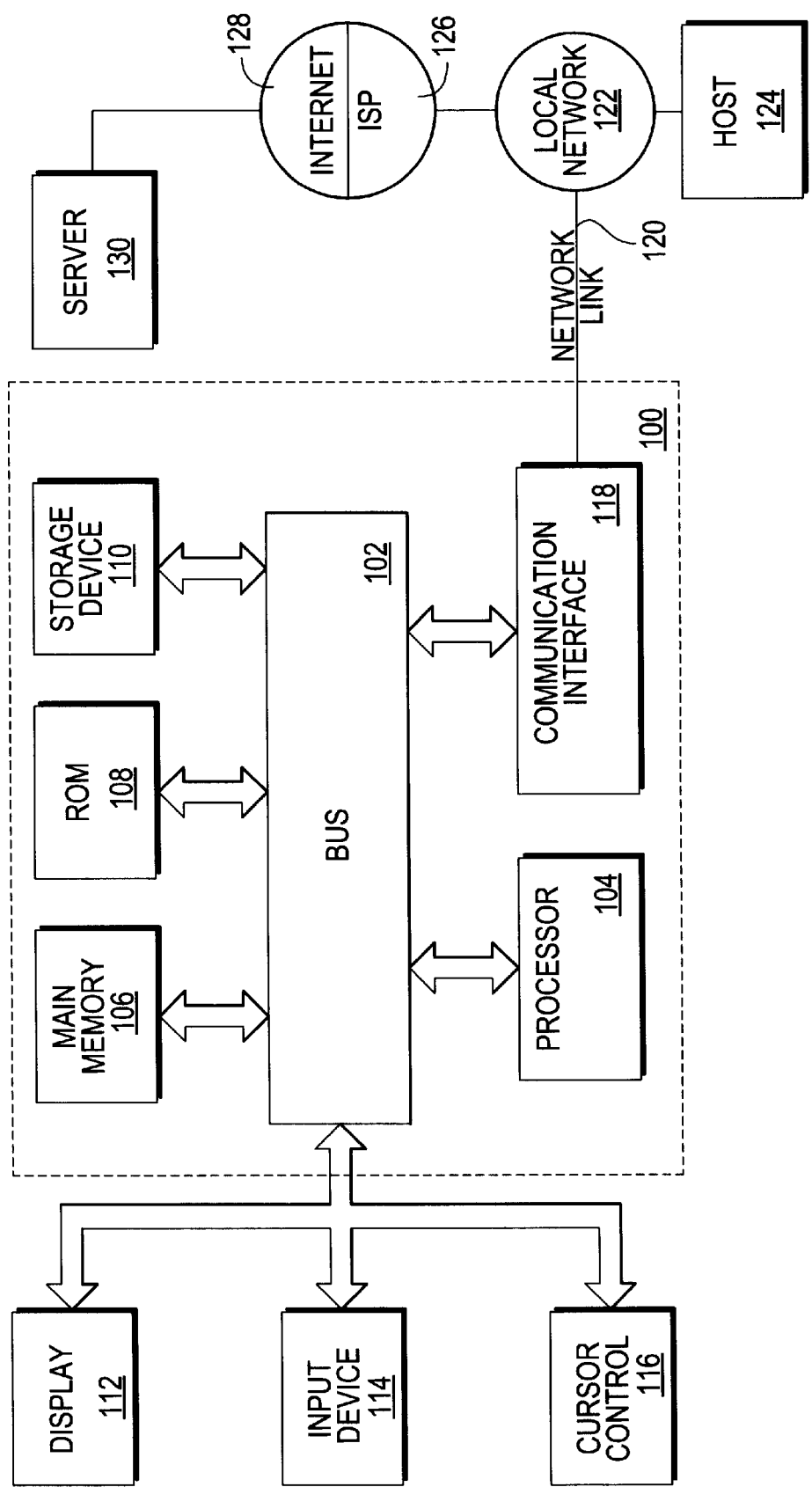
FIG. 1 is a block diagram of a computer system that may be programmed for activating a licensed product.

FIG. 1 is a block diagram that illustrates a computer system 100 that can be programmed for activating a licensed product. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing a licensing manager mechanism. According to one embodiment of the invention, a licensing manager mechanism is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet-switched data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for a licensing manager mechanism as described herein.

Processor 104 executes the received code as it is received, and/or stored in storage device 110, or other non-volatile storage for later execution. In this manner, computer system 100 may obtain application code in the form of a carrier wave.

LICENSED PRODUCT DISTRIBUTION CONTEXT

A preferred embodiment is used in the context of the distribution of a licensed product from a manufacturer or licensor, who owns the licensed product, through a distributor to a customer who wishes to license the licensed product for use at the customer's site. Generally, the customer learns about the licensed product, works with the distributor to ensure that the licensed product will meet the customer's needs, and then buys a license of the product from the licensor through the distributor. When the licensed product is a software product, it is supplied from the licensor to the customer electronically, for example, by transmission over a network. The customer installs and activates the licensed product as described herein. Alternatively, when the licensed product is embodied in a tangible form, it is shipped from the distributor to the customer, and the customer then activates the licensed product using the mechanisms described herein. In either case, after licensing, installing, and activating the licensed product, the customer's interaction with the distributor and licensor is generally complete, and the customer proceeds to use the licensed product for its intended functions.

Further, alternatively, in addition to the distributor, there may be a retailer who interacts with the customer and supplies the licensed product from the distributor to the customer. In another alternative, the distributor and the licensor are the same entity.

Figure 2A:
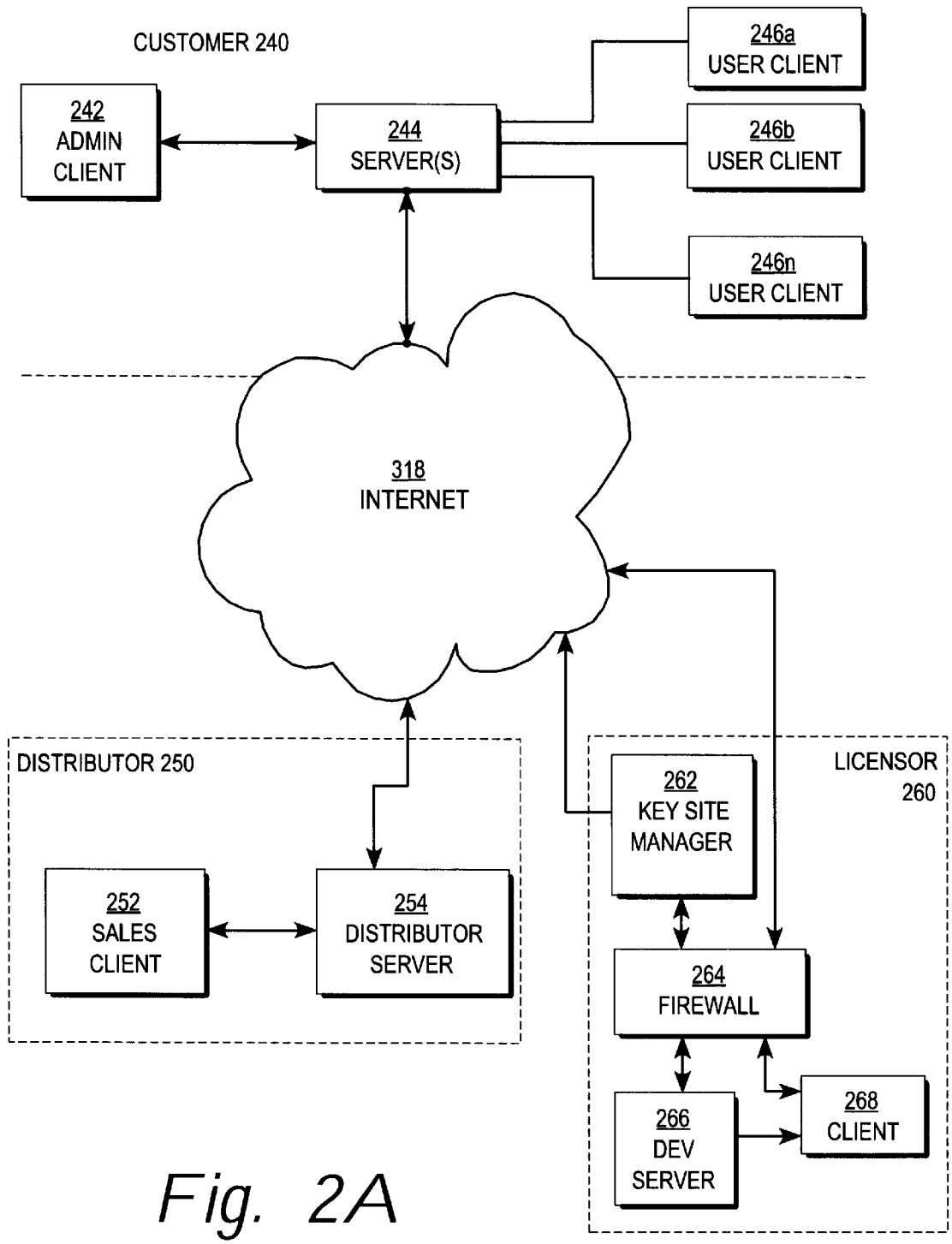
FIG. 2A is a block diagram of a computer system context.

FIG. 2A illustrates in block form an example of the parties and systems involved in this context. The customer 240 has an administration client 242 that is coupled to one or more servers 244. One or more user clients 246a, 246b, 246n are coupled, directly or indirectly (for example, over a local area network) to the servers 244.

The administration client 242, and the other clients referenced in this description, is an end station device such as a personal computer, workstation, network computer, printer, scanner, etc. In the preferred embodiment, the administration client 242 and the other clients have a processor that executes an operating system and a browser program under control of the operating system. The browser program is an industry-standard World Wide Web browser, such as Micro soft Internet Explorer®, Netscape Navigator® or NCSA Mosaic.

The servers 244 are computer systems that are coupled to the world-wide packet-switched network known as the Internet 318. The servers 244 comprise one or more administration servers and application servers. For example, the servers 244 comprise an application server that is used to store and run application programs that are useful to the users of the user clients 246a, 246b, 246n. The servers 244 also comprise one or more development servers that are used to temporarily store and test new applications before the new applications are deployed to the application server. Preferably, each of the clients 242, 246a–246n communicates with the servers 244 using industry-standard protocols such as Transmission Control Protocol (TCP), Internet Protocol (IP), and Hypertext Transfer Protocol (HTTP). Collectively, the clients 242, 246a–246n, the servers 244, and the intranetworking devices that interconnect them are known as an Intranet.

A distributor 250 has a sales client 252 coupled to a distributor server 254 which in turn is coupled to the Internet 318. In an embodiment, the distributor 250 is a sales office for the promotion of various licensed products including those of the licensor 260. The sales client 252 is an end station device that is used by a salesperson of the distributor 250. The distributor server 254 is used by the sales client 252 to connect to the Internet 318 and contact customers, prospective customers, conduct market research, and other activities involved in the promotion, sale and licensing of licensed products. Using the Internet 318, the distributor 250 can connect the distributor server 254 or the sales client 252 to the licensor 260.

The licensor 260 is the owner of the licensed product. For example, when the licensed product is a software product, the licensor 260 is a licensor of software products. The licensor 260 has one or more clients 268, which are end stations used by employees and staff of the licensor to carry out activities such as sales, development, marketing and distribution of the licensed product in connection with one or more servers 266. For example, when the licensor 260 is a software developer and the licensed product is a software product, one of the clients 268 is coupled to a development server 266 that stores program code for the software product. The development server 266, and other servers, is coupled through a firewall 264 to the Internet 318.

The firewall 264 is a network device that is logically interposed between the Internet 318 and the development server 266, or other servers. The firewall 264 intercepts all communications moving to and from the Internet 318 and determines whether to admit or block the communications. The firewall 264 can prevent unauthorized clients from connecting to the development server 266 and other devices that are behind the firewall.

The licensor 260 also has a key site manager 262, which is a specialized server device that is coupled to or accessible through the Internet 318. As described in more detail below, the key site manager 262 is used by the distributor 250 to report to the licensor 260 that the distributor has sold or licensed a copy of the licensed product to the customer 240. The key site manager 262 is also used by the customer 240 to activate its copy of the licensed product.

LICENSING MANAGER OVERVIEW

Figure 2B:
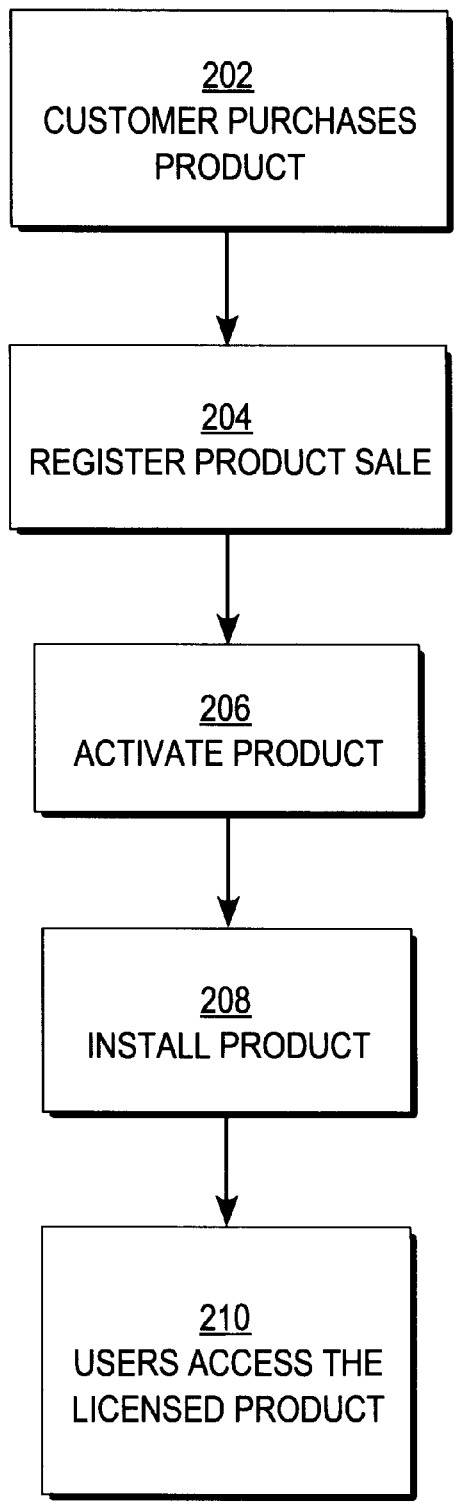
FIG. 2B is a top-level flow diagram illustrating a sequence of steps for registering, activating, installing and regulating a licensed product.

A licensing manager is described herein which provides a mechanism for regulating the reproduction and unauthorized use of a licensed product. FIG. 2B is a top-level flow diagram illustrating a sequence of steps for registering, activating, installing and regulating a licensed product according to a preferred embodiment.

In the preferred embodiment, the steps shown in FIG. 2B are carried out by one or more computer programs or objects that are executed by one or more processors at the customer 240, distributor 250, and licensor 260. In this discussion, the process of FIG. 2B will be discussed in the context of a purchase transaction in which the customer 240 purchases or licenses a licensed product from the distributor 250, and in which the licensed product is a software product developed by the licensor 260.

Generally, a customer transaction begins when the distributor 250 identifies a customer prospect and licenses or sells the licensed product to the customer 240. In this context, "sell" or "purchase" means to consummate a license transaction in which the distributor grants, directly or on behalf of the licensor 260, the right to use the licensed product to the customer 240, without transferring title or ownership rights to the customer 240. This is the conventional way that software products are transferred to a customer 240. Alternatively, the customer 240 independently learns about the licensed product, decides that it wishes to license the product, and contacts the distributor 250 to initiate a purchase transaction. In either case, at step 202 the customer 240 purchases a licensed product from the distributor 250. In this context, "distributor" refers collectively to: in the case of a distributor channel transaction, a licensed product distributing organization that is separate from the licensor 260, manufacturer or developer of the licensed product; and, in the case of a direct transaction, the licensor, manufacturer or developer itself. Further, the term "distributor" also refers to the combination of a distributor and a retailer.

In general, the licensed product is stored on physical media such as CD-ROMs, computer tapes, or computer disks that are manufactured by the licensor 260, and then shipped to and controlled by the distributor 250. The physical media can contain one or more different licensed products that may be separately sold by the distributor. In addition to the licensed products, the physical media also contains an installation program that is used to install the licensed product onto a customer machine such as the servers 244. "InstallShield" is an example of a commercially available installation program used in connection with personal computer software. At the time of manufacture by the licensor 260, shipment to the distributor 250, and shipment to the customer 240, the licensed product is locked or disabled, and cannot be used by the customer. Because licensed products are disabled when shipped, during the installation the customer 240 is required to provide certain key information to the installation program in order to install and activate a particular product, as discussed further herein.

At step 204, the distributor 250 registers the license or sale of the licensed product with the licensor 260. In this context, "register" refers to a process whereby the distributor 250 reports to the licensor 260 that the distributor has sold or licensed the product to the customer 240. Inferentially, the registration process operates as a request by the distributor 250 on behalf of the customer 240 for the licensor 260 to authorize the customer to use the product when the customer next contacts the licensor.

To register the license or sale of the licensed product, the distributor 250 connects a client, such as the sales client 252, to the licensor 260. For example, the distributor 250 uses a Web browser, at the sales client 252, to connect to the licensor 260 over the Internet 318. When connected, the distributor 250 logs into a key site manager 262 located on the network system. The distributor 250 then enters information that identifies the customer 240 and the particular licensed product that was purchased by the customer. Using the customer and licensed product information, the key site manager 262 generates a customer account. The customer 240 is provided with access information that will allow them to access the key site manager 262 in order to activate the licensed product.

At step 206, also preferably using a Web browser, the customer 240 logs into the key site manager 262 of the licensor 260 and uses the access information to activate the licensed product. By activating the licensed product the customer is provided with key information that the customer is required to enter during subsequent installation of the licensed product. The key information contains encrypted information that defines, among other things, the license level (for example, the number of concurrent users) that was purchased by the customer.

At step 208, the customer 240 executes the installation program in order to install the licensed product at the customer's site. For example, the licensed product is installed on one of the servers 244 that can be accessed over the customer's network. When the customer executes the installation program, the customer is queried to enter the key information by the installation program. When the installation program is complete and the licensed product is fully installed, the licensed product employs a verification scheme that uses the key information to regulate the number of concurrent users of the licensed product, for example.

At step 210, end users of the customer 240 access the licensed product over the customer's network. For example, the user clients 246a–246n connect to one of the servers 244 that is running the installed licensed product. As the clients access the licensed product, a verification mechanism regulates or limits client access, so that the total number of concurrent users of the licensed product does not exceed the license level that was purchased by the customer.

FIGS. 2C, 2D, 2E and 2F depict a flow diagram illustrating another embodiment of the foregoing process. The steps of FIGS. 2C, 2D, 2E and 2F are described below in connection with certain structural diagrams that will enhance understanding of the process.

REGISTERING SALE OF LICENSED PRODUCT

Figure 3:
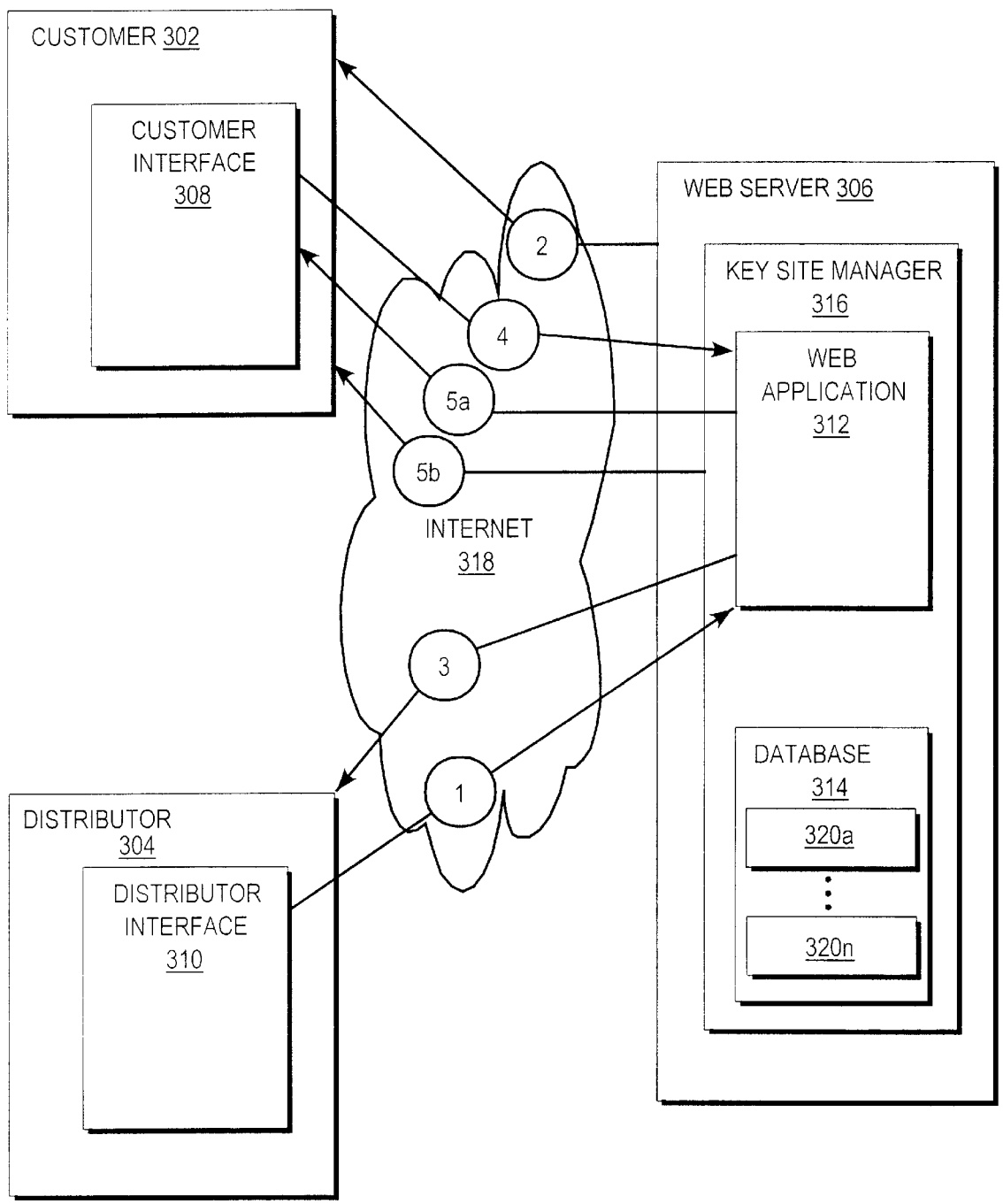
FIG. 3 is a block diagram of a licensing manager mechanism.

FIG. 3 is a block diagram of a licensing manager mechanism 300 that involves a customer 302, a distributor 304 and a server 306. Preferably, the server 306 is owned or controlled by the licensor or owner of the licensed product. In this example, customer 302, distributor 304 and server 306 respectively include a customer interface 308, a distributor interface 310 and a web application 312. The customer interface 308, distributor interface 310, and web application 312 respectively provide the customer 302, distributor 304, and server 306 each of them with the ability to communicate with each other over the Internet 318. In one embodiment, customer interface 308 and distributor interface 310 are Web browsers that are respectively used by the customer 302 and distributor 304 to communicate with the web application 312. Server 306 includes a key site manager 316 that controls and coordinates an interface between the web application 312 and a database 314. The database 314 is used to store, maintain and manage customer accounts 320a–320n for those customers that have purchased or licensed a product. The database 314 is also used to store, maintain and manage distributor accounts for those that are authorized to distribute the product. The distributor accounts are typically used for reporting sales of the licensed product.

In one embodiment, the customer interface 308 is the administration client 242, and the distributor interface 310 is the sales client 252.

Figure 2C:
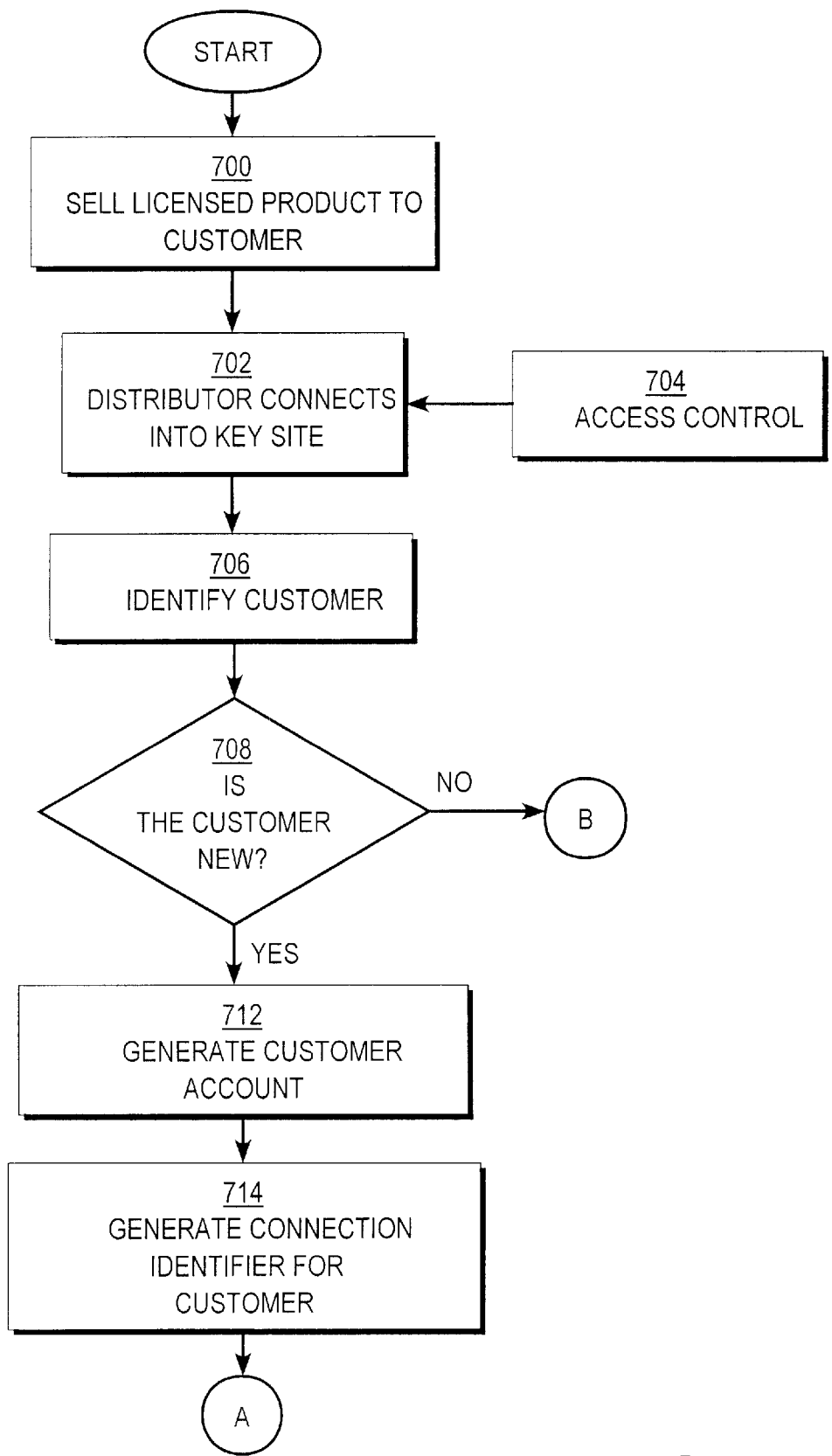
FIG. 2C is a flow diagram showing another sequence of steps for activating a licensed product.
Figure 2D:
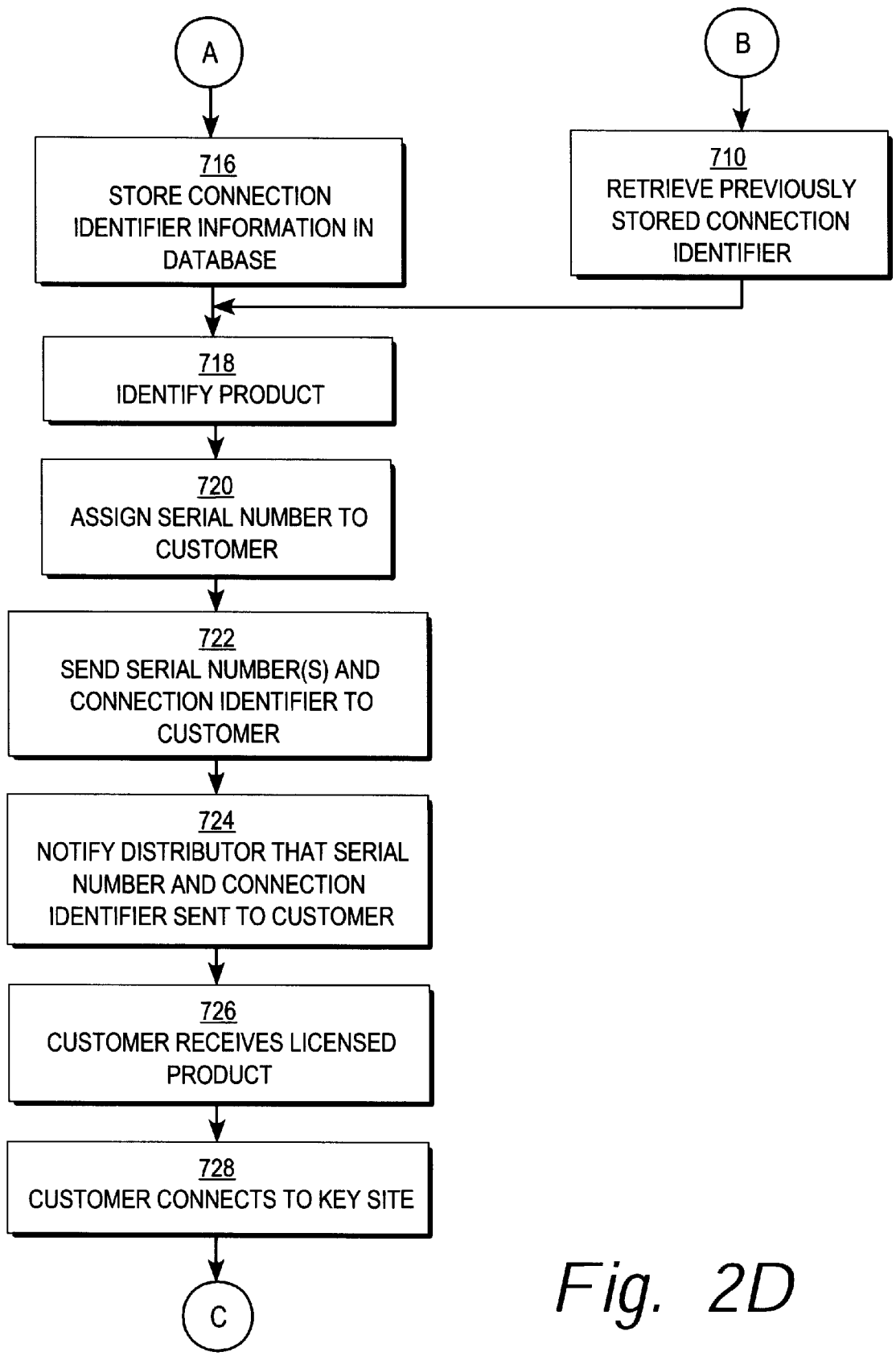
FIG. 2D is a flow diagram that illustrates further steps in the method of FIG. 2C.
Figure 2E:
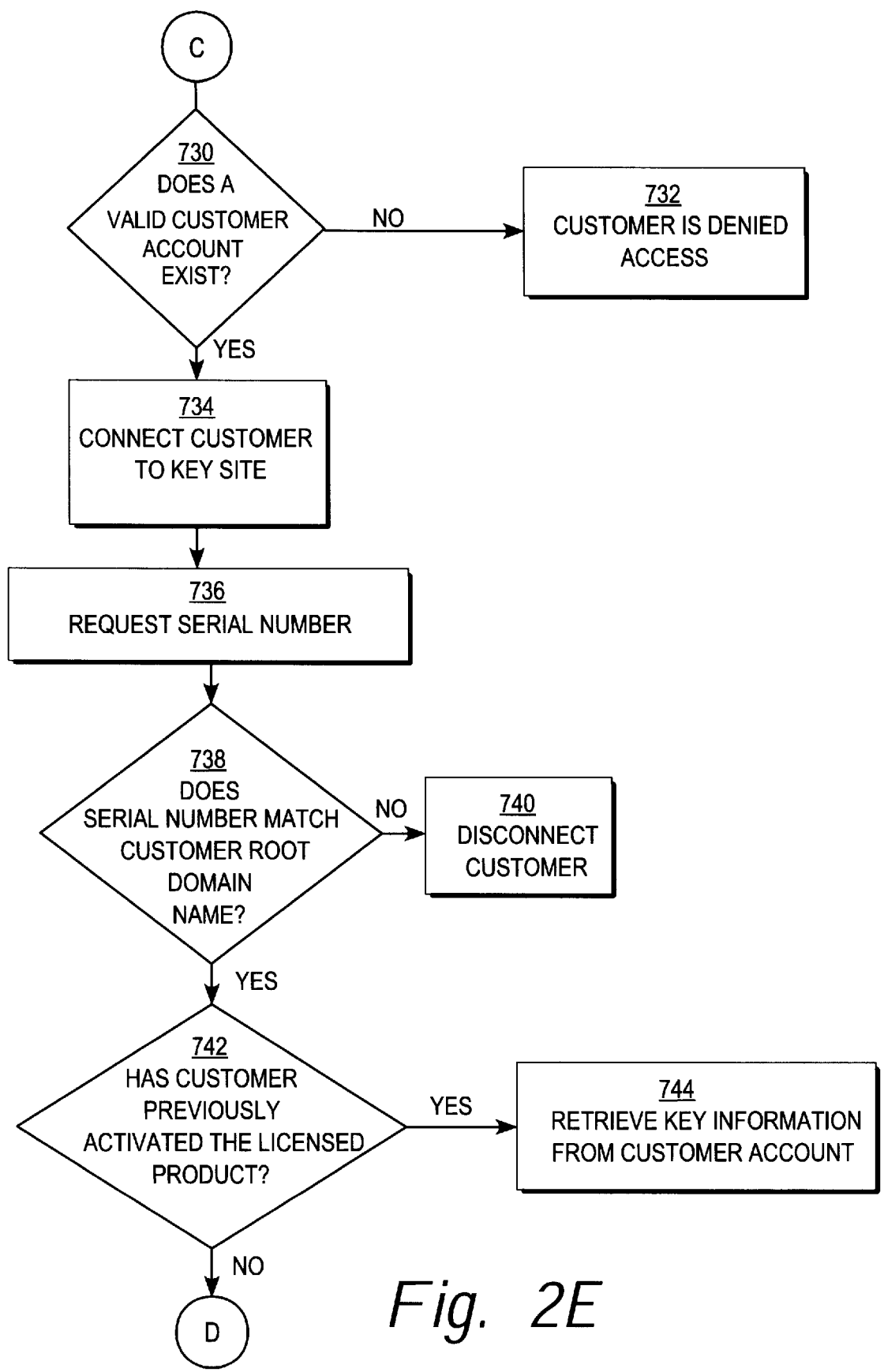
FIG. 2E is a flow diagram that illustrates further steps in the method of FIG. 2C.
Figure 2F:
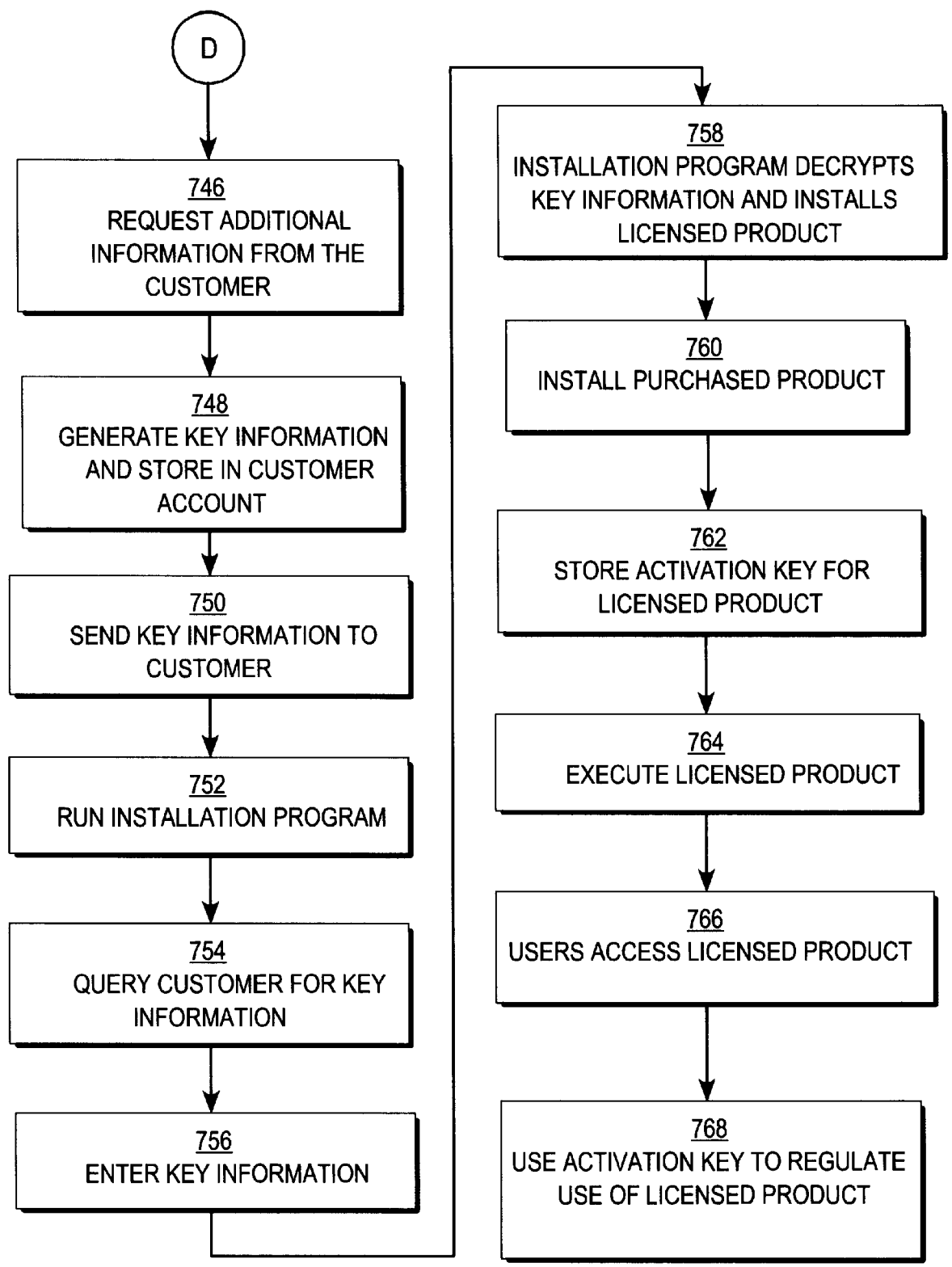
FIG. 2F is a flow diagram that illustrates further steps in the method of FIG. 2C.

As indicated by step 700 in FIG. 2C, using the licensing manager mechanism 300, a transaction begins when a customer 302 purchases a licensed product from a distributor 304. At step 702, as shown by state 1, the distributor 304 uses the distributor interface 310 to connect to the web application 312 over Internet 318 to register the sale of the licensed product. Access to the web application 312 is controlled, for example, through the use of access information such as a login name and password. At step 704, the distributor 304 provides valid access information, which identifies the distributor as one who is authorized to access the web application 312, to the web application server. In one embodiment, the distributor 304 is required to submit a valid username and password to access the web application 312.

In an alternate embodiment, the distributor 304 is required to submit a digital certificate to access the web application 312. The digital certificate is issued by a trusted certificate authority and provides a way for the web application 312 to verify and authenticate the identity of an individual who purports to represent the distributor 304. For example, the distributor 304 or its representative provides a VeriSign Digital ID® previously issued to the distributor or representative by VeriSign, Inc.

After the distributor 304 obtains access to the web application 312, the web application 312 generates a sales information page. The sales information page is a static HTML page or dynamic HTML page. The web application 312 returns the sales information page to the distributor interface 310, for example, using an HTTP transaction, and in response the distributor interface displays the page. It will be understood that the interactions between the distributor 304 and the web application 312, and between the customer 302 and the web application server 312, generally occur through an HTTP dialogue of the foregoing type. In the HTTP dialogues, the interfaces request particular HTML pages, the web application server generates the pages, and returns the pages to the interfaces at which the pages are displayed.

When the sales information page is displayed at the distributor interface, a representative of the distributor 304 enters sales information that identifies the customer 302, as shown in step 706. For example, a representative of the distributor 304 enters customer information in data entry fields of the sales information page and submits the page. In a preferred embodiment, the representative supplies at least the following sales information:

(1) the customer's name; and
(2) a valid customer email address for the person responsible for system administration of the product, for example, a network administrator.

At step 708, the key site manager 316 searches the database 314 to determine whether the customer 302 is a "new" customer. In this context, a customer is a "new" customer when the customer has not previously purchased or licensed a licensed product. If at step 708 the key site manager 316 determines that the customer 302 is not "new", then at step 710, the key site manager 316 retrieves a previously stored connection identifier associated with the customer from the customer account 320 in the database 314. In certain embodiments, the connection identifier consists of a unique user identifier ("user_ID") and password. Control proceeds to step 718.

However, if at step 708 the key site manager 316 determines that the customer 302 is "new", then at step 712, the key site manager 316 generates a new customer account 320 for the customer 302 in database 314.

At step 714, the key site manager 316 generates a connection identifier that can be used by the customer 302 to connect to the web application 312. In one embodiment, the connection identifier is a user_ID that is generated using the root domain name that was supplied in the customer's email address (for example, companyA.com). At step 716, the key site manager 316 stores the connection identifier into the customer account 320. Thereafter, to connect to the web application 312, the customer 302 is required to provide the connection identifier to the web application 312.

At step 718, the distributor enters and submits information that describes the particular product that has been licensed by the customer 302. For example, in a preferred embodiment, the distributor 304 supplies the following sales information to the web application 312:

(1) a product name;
(2) the version number of the product;
(3) a license level that has been sold or licensed to the user, for example, the number of user access licenses purchased, such as 500 authorized users; and
(4) an indication of whether the customer is entitled to receive free upgrades, for example, information that indicates the customer purchased a support contract that is valid until a particular time.

When the foregoing information has been entered in the sales information page, the distributor's representative selects a "Submit Form" button that is displayed in the page. In response, the distributor interface 310 returns the filled-in sales information page to the web application 312. The web application 312 extracts the information that has been filled in by the distributor and stores it in database 314, in association with information identifying the customer.

At step 720, using the supplied sales information and under control of the web application 312, the key site manager 316 generates a unique product serial number for each product that was purchased and identified in the sales information page, and assigns the serial numbers to the customer 302. The serial number is then stored in the database 314. Each unique serial number provides a key to the key site manager 316 that can be used to locate and retrieve customer information (including the customer domain name and license level purchased), that was previously stored in the database 314.

The unique serial numbers may be generated using a variety of techniques. For example, in one embodiment, the key site manager 316 generates the unique serial numbers by concatenating one or more letters with a unique incrementing sequential number (GA00001, GA00002, GA00003, . . . ) In an alternative embodiment, the key site manager 316 uses the customer's root domain name and the license level that was purchased to create a unique product serial number. For example, FIG. 4 illustrates a unique product serial number 400 in accordance with certain embodiments of the invention. As depicted, the product serial number 400 is comprised of two fields, a root domain name field 402 and license level field 404. In this example, the root domain name of the customer is "companyA.com", and the purchased license level value is 5000 users. In certain embodiments, the root domain name field 402 and license level field 404 are encrypted in generating the product serial number 400.

At step 722, the key site manager 316 uses the customer email address, previously provided by the customer and stored in association with the customer information, to transmit to the customer 302 the serial number and connection identifier in an electronic mail message. This step is represented by state 2 of FIG. 3. Preferably, the electronic mail message includes instructions describing to the customer 302 how to obtain an activation key for the licensed product. In certain embodiments, the key site manager 316 sends the serial number and the connection identifier to the customer 302 as separate email messages. Using separate email messages for this information tends to increase the security of the system by reducing the chance that a malicious party, who is "sniffing" email traffic dispatched by the key site manager 316, can intercept all the information. In one embodiment, the key site manager 316 emails the serial number and connection identifier to the customer 302 using a secure email protocol such as Secure Multimedia Internet Mail Extensions (S/MIME).

At step 724, the licensing manager 316 transmits the serial number to the distributor 310 in an electronic mail message. In the same message or a different message sent at about the same time, as indicated by state 3 in FIG. 3, the licensing manager 316 notifies the distributor that the account information has been transmitted to the customer 302. This provides the distributor with a confirmation that the customer has registered at the key site, and implicitly provides authorization from the licensor 260 to the distributor 250 for the distributor to release a copy of the licensed product to the customer 302.

At step 726, the distributor 304 provides the customer 302 with physical media containing the licensed product. For example, step 726 may involve delivering physical media, such as a disk or CD-ROM that contains the licensed product, to the customer 302. Alternatively, step 726 involves communications between the distributor 304 and the customer 302 that result in the customer downloading the licensed product from a web server or other facility of the distributor.

In certain embodiments, the physical media additionally contains one or more products that were not purchased by the customer 302. Thus, a single physical medium can provide a combination of different licensed products to a variety of customers.

ACTIVATING THE LICENSED PRODUCT

Customer 302 receives the licensed product from the distributor. However, the licensed product includes a key activation mechanism that prevents the customer 302 from using the licensed product without certain key information. Thus, before customer 302 can install and run the licensed product on a computer such as the server 244 and make the licensed product available to the user clients 246a–246n, the customer must obtain, from the licensor 260, key information that can be used to activate the licensed product.

When the customer 302 is ready to activate the licensed product, at step 728, the customer uses the customer interface 308 to connect to the web application 312 through the Internet 318, as indicated by state 4 in FIG. 3. Alternatively, the customer 302 uses a Web browser at the administration client 242 to establish an HTTP connection through the Internet 318 to the key site manager 262. When the connection is established, to access the web application 312, the customer 302 enters its connection identifier that was previously sent to the customer 302 in state 2. For example, a representative of the customer 302 enters a user identifier and password in a login screen that is generated by the web application 312.

At step 730, in response to receiving a connection identifier sent from the customer 302 to the web application 312, the key site manager 316 searches the database 314 to determine if the connection identifier corresponds to a valid customer account. For example, the key site manager 316 assembles a database query in the SQL language and dispatches the query to the database 314. The database 314 constructs a set of matching records as a response, and returns the response to the key site manager 316. The key site manager 316 receives and analyzes the response to determine whether the connection identifier has been found in the database 314, that is, whether the connection identifier is associated with a valid customer account. If at step 730 the key site manager 316 determines that the connection identifier does not correspond to a valid customer account, then at step 732, the customer 302 is denied further access to the web application 312. For example, if the connection identifier is not found in the database 314, the web application 312 generates a web page that informs the customer 302 that access is denied.

However, if at step 730 the database query is successful, so that the key site manager 316 determines that the connection identifier does correspond to a valid customer account, then at step 734, the customer 302 is connected to the web application 312. Thus, using the connection identifier, the web application 312 and key site manager 316 can regulate access to authorized customers by blocking access to unauthorized customers.

In certain embodiments, the customer 302 is required to change its password the first time the customer logs into the web application 312. The new password is stored in database 314 in association with other information that comprises the customer's account 320.

At step 736, upon logging into the web application 312, the customer 302 is queried for certain identification information. In one embodiment, the web application 312 generates a web page having a fill-in form, comprising fields in which the customer 302 enters the corresponding serial number of the product that was purchased by the customer.

After filling in the foregoing information in the fields of the fill-in form, the customer 302 submits the filled-in form to the web application 312. At step 738, the web application 312 determines whether the serial number corresponds to the customer 302. If the serial number does not correspond to the customer 302, then at step 740, the customer 302 is not provided with the key information and is refused further access to the web application 312 by terminating the connection. In certain embodiments, the web application 312 displays an error message to the customer 302 before terminating the connection. The web application 312 then notifies the licensor 260 of the problem. In one embodiment, the customer 302 is allowed to enter an invalid serial number a particular number of times before being disconnected. For example, if the customer 302 enters an invalid serial number an invalid entry counter is incremented. If the value of the invalid entry counter is less than a particular number, then control proceeds to step 736 to query the customer 302 for a correct serial number. However, if the value of the invalid entry counter is greater than or equal to the particular number, the customer 302 is refused further access to the web application 312 by terminating the connection.

Alternatively, at step 738, if the web application 312 determines that the serial number does correspond to the customer 302, then at step 742 using the serial number supplied by the customer 302, the key site manager 316 determines whether the customer has previously activated the licensed product. In certain embodiments, this step involves issuing a query to the database 314 to determine whether the product serial number entered by the customer is a duplicate entry in the database. If at step 742 the key site manager 316 determines that the customer has previously activated the licensed product, then at step 744 the key site manager 316 retrieves existing activation key information from the database 314 and displays the information to the customer 302. In certain embodiments, the activation key information is emailed to the customer using a previously supplied email address.

However, if at step 742 the key site manager 316 determines that the customer has not previously activated the licensed product, then at step 746 the customer is requested to enter additional information. In certain embodiments, the web application 312 generates a web page having a fill-in form that contains fields for which additional information is requested from the customer 302. For example, the fill-in form may request the customer 302 to supply the following additional information:

(1) name of the customer's contact person or administrator;
(2) customer address;
(3) phone number;
(4) fax number;
(5) contacts within the company (i.e. name & email address); and
(6) whether the customer wants to receive notices and update information about the licensed product.

After filling in the foregoing information in the fields of the fill-in form, the customer 302 submits the filled-in form to the web application 312. In certain embodiments, this information is optional, such that the customer may choose to supply some, all or even none of the requested information.

At step 748, the key site manager 316 generates key information and stores it in the customer's account 320 in database 314. In the preferred embodiment, the key information consists of an installation key and encrypted activation key that is used by the installing program when installing the licensed product. The activation key is used by the licensed product on an on-going basis to regulate the total number of users to the license level that was purchased by the customer 302.

Figure 5:
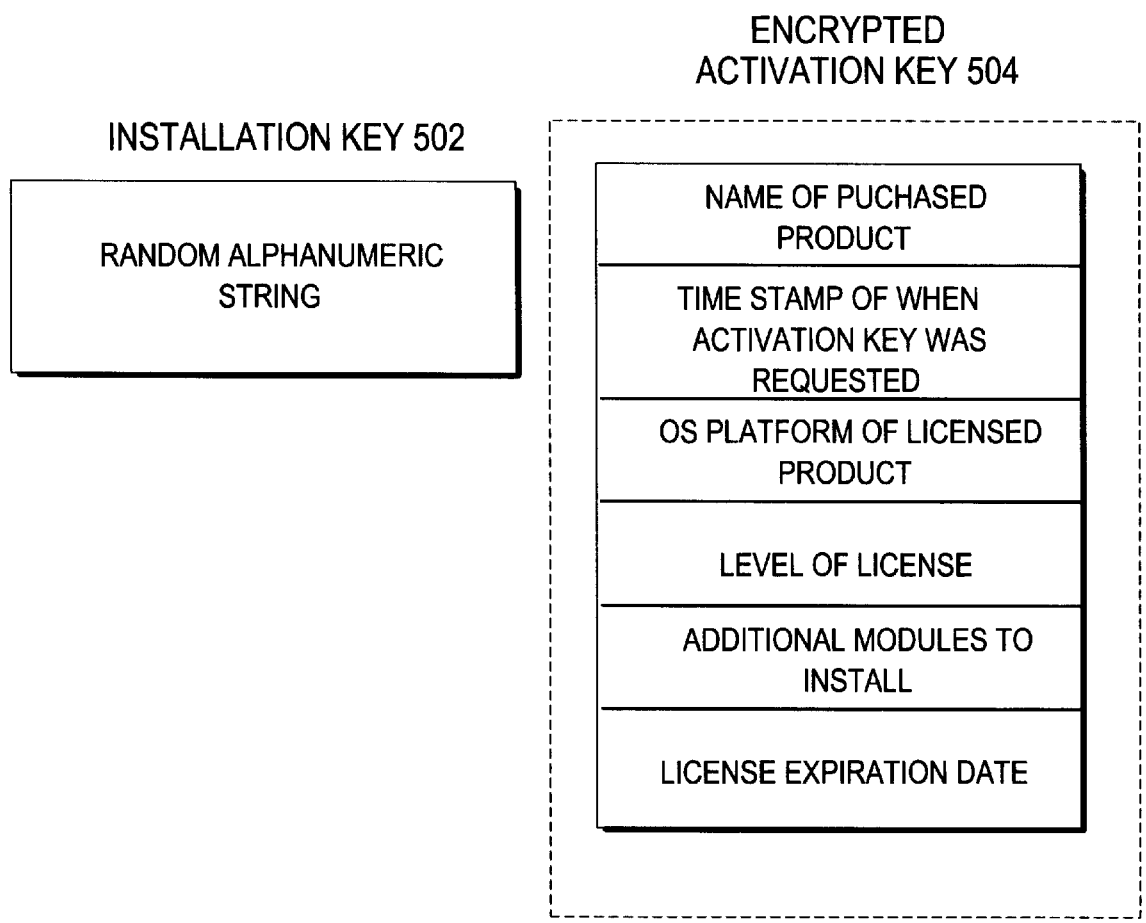
FIG. 5 illustrates an encrypted installation key and an encrypted activation key.

FIG. 5 illustrates an installation key 502 and encrypted activation key 504 according to an embodiment. In this example, the installation key is an alphanumeric string that is generated using a random number generator. Several techniques can be used to produce installation key values for which duplicate key values are minimized for a particular period of time. Alternatively, in this example, the encrypted activation key 504 comprises six fields that include:

(1) the name of the product that is to be installed by the installing program;

(2) historical data indicating when the activation key was requested;

(3) the specific OS platform version for which the licensed product was purchased;

(4) the license level that was purchased;

(5) the name of any additional modules that need to be installed (such as extensions of the licensed product); and (6) whether a license expiration date exists and if so, the expiration date.

At step 750, the key site manager 316 sends the key information to the customer 302. In one embodiment, the key information is provided to the customer 302 by displaying it on the customer interface 308, as indicated by state 5a. In another embodiment, the key information is provided to the customer 302 by emailing it to the customer 302, as indicated by state 5b.

INSTALLING THE LICENSED PRODUCT

At step 752, the customer 302 runs an installation program that is included on the physical media that contains the licensed product. For example, the customer inserts the media containing the licensed product into the administration client 242, and commands an operating system running on the administration client to execute a "setup" or "install" program that is provided on the media. At step 754, as the installation program runs, the customer 302 is prompted to enter the key information, such as the encrypted installation and activation keys and the customer domain name. For example, the installation program displays a pop-up window on the administration client that prompts the customer to enter the installation key and the activation key and customer domain name. At step 756, the customer 302 enters the corresponding key information and customer domain name.

At step 758, the installation program receives and decrypts the activation key information, using the installation key and customer domain name. During the decryption stage, the installation program combines the installation key and the customer domain name to generate an encryption key. The installation program then uses the encryption key to decrypt the activation key to determine the licensed product that was purchased by the customer. The installation program then locates and selects files representing the licensed product on the media. In certain embodiments, if the customer enters an installation key and the customer domain name pair that generate a "bad" encryption key (for example an encryption key that can not be used to decrypt the activation key), the customer is provided a second opportunity to enter valid information before the installation program terminates execution.

At step 760, the installation program installs the licensed product, for example, by copying, decompressing, or extracting the selected files onto the customer computer. By requiring the customer 302 to provide both installation and encrypted activation keys to an installer program at the time a licensed product is installed, the licensing manager mechanism can ensure that the licensed product was actually purchased by the specific customer and not received surreptitiously. This allows the physical media to contain multiple licensed programs, and tends to inhibit piracy of the licensed product.

At step 762, as part of the installation process, the installation program stores both the installation and encrypted activation keys on the customer's machine. This step ensures that the activation key is available for use by the licensed product.

ACCESSING THE LICENSED PRODUCT

At step 764, the licensed product is used by the customer 302. For example, in the case in which the licensed product is a software product, the customer 302 executes the licensed product on a computer of the customer, such as the server 244. At step 766, individuals associated with the customer 302 access the licensed product. For example, one or more of the user clients 246a–246n access the licensed product at the server 244 over the customer's network, and use the licensed product.

At step 768, the licensed product decrypts the activation key to obtain a total number of client access licenses value that is used to regulate the total number of users that can be registered in the system at any single point in time. In certain embodiments, the licensed product decrypts the activation key and verifies the total number client access licenses whenever one of the following events occurs:

(1) a system administrator attempts to register a new user in the system;

(2) a system administrator performs a batch load of users from a source system, such as a user database or directory, into the licensed product;

(3) an application attempts to register a new user in the licensed product; or (4) a new user attempts to self-register into the licensed product.

In one embodiment, when an individual attempts to access the licensed product over the customer's network, the licensed product compares the previously stored customer domain name to the domain name of the individual requesting access. If the domain name of a computer terminal used by an individual who is requesting access matches the previously entered customer domain name, the individual is allowed to access the licensed product.

In another embodiment, the licensed product decrypts and uses the activation key to validate certain parameters during execution of the licensed product. For example, in one embodiment, the licensed product provides an application programming interface (API) that requires interfacing programs to present the activation key for verification before being able to interface and execute with the licensed product. This can be used to prevent unauthorized programs from executing and thus provide a mechanism for protecting against potential viruses.

UPGRADING AN EXISTING LICENSED PRODUCT

Customers who have purchased a licensed product may at some point want to add additional authorized users or licenses, so that the license level of the licensed product is changed. Customers may also wish to upgrade to a more recent version of the product. Through the use of the licensing manager mechanism described herein, a customer can quickly and easily upgrade to a newer version or purchase additional licenses.

As described herein, the activation key for a particular licensed product contains an encoded identification of, and controls, the number of users that can currently access the product. Therefore, to purchase additional licenses to increase the license level of a previously purchased product, the customer simply obtains a new activation key that contains an encoded identification of the new or changed license level field. Similarly, to upgrade the customer's licensed product to a new version, the customer obtains a new activation key that contains an encoded identification of the new or upgraded licensed product.

In certain embodiments, to purchases additional licenses, steps similar to those contained in FIGS. 2C, 2D, 2E and 2F are followed. For example, at step 700 the customer purchases additional licenses from distributor 304. Steps 702–750 are then followed as previously described to provide the customer with new key information for the additional licenses. However, at step 750, the customer 302 is provided with a new activation key that can be used to add additional users to the system. Once the customer 302 obtains the new activation key, the customer causes the previously stored activation key to be replaced with the new activation key. In one embodiment, to replace the previously stored activation key, the customer 302 reruns the installation program. The installation program displays a pop-up window on the administration client that prompts the customer to enter the new activation key. The installation program then attempts to decrypt the new activation key information using the previously stored installation key and customer domain name. If the installation program successfully decrypts the new activation key, the license level is appropriately adjusted based on the license level contained in the new activation key. The installation program then stores the new activation key on the customer's machine for later use by the licensed product. Steps 764–768 are then followed once the new activation key is stored on the customer's machine.

In this example, because the customer 302 is only increasing the license level and not upgrading to a more recent version of the product, the distributor 304 is not required to provide the customer 302 with additional physical media.

To purchase an upgraded of a previously purchase product (product upgrade), in certain embodiments, steps similar to those contained in FIGS. 2C, 2D, 2E and 2F are also followed. For example, at step 700 the customer 302 purchases the product upgrade from distributor 304. As previously stated, the product upgrade may be provided to the customer by downloading it through an Internet connection or by providing the customer with media containing the new version of the licensed product. Steps 702–756 are followed as previously described to provide the customer with a new key information (new installation key and new encrypted activation key) for the product upgrade. However, at step 752, the customer 302 runs the new installation program that is provided with the product upgrade. In running the new installation program, the new installation program displays a pop-up window on the administration client that prompts the customer to enter the new key information and customer domain name. Using the new key information and customer domain name, the new installation program attempts to decrypt the previously stored activation key. By correctly decrypting the previously stored activation key the new installation program verifies that the customer is attempting to upgrade the correct licensed product with a valid new activation key. The new installation program then installs the product upgrade as previously described in step 760, based on the information that is contain in the fields of the new activation key. Steps 762–768 are then followed as previously described.

As described, the licensing manager provides a mechanism that is convenient to the customer and which can be easily used by distributors who are not intimately familiar with the licensed product. In addition, because the licensing manager provides a mechanism that supports a limited number of part numbers for each licensed product (i.e. many licensed products may reside on a single physical medium), the number of different products in inventory is minimized.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for regulating use of a licensed product, comprising the steps of:

registering a sale of the licensed product by storing sales information licensee and the licensed product;

generating access information that uniquely identifies the licensee and the licensed product;

sending, to a remote location that is separate from the licensee, a message that identifies the licensed product and which authorizes the delivery of the licensed product to the licensee;

in response to receiving a request from the licensee to activate the licensed product, in which the request contains the access information, generating key information based on the sales information, wherein the key information comprises information identifying the licensee, an installation key and an encrypted activation key;

communicating the installation key and the encrypted activation key to the licensee; and allowing the licensee to access or use the licensed product only after providing the installation key, the encrypted activation key and a portion of the sales information to the licensed product.

2. The method recited in claim 1, in which the step of allowing the licensee to access or use the licensed product comprises the step of allowing the licensee to install and use the licensed product only when the licensee provides key information matching the sales information.

3. The method recited in claim 2, further comprising the step of selectively installing a particular set of additional modules, wherein the particular set of additional modules are identified by the key information.

4. The method recited in claim 1, in which the step of registering a sale includes the steps of:

receiving the sale information from the remote location; and storing the sales information in a server that is logically separate from the remote location and the licensee.

5. The method recited in claim 4, in which the step of communicating the key information includes the step of sending the key information to the licensee in an electronic mail message.

6. The method recited in claim 4, in which the step of communicating the key information to the licensee includes the step of displaying the key information on a client interface.

7. The method recited in claim 1, in which the step of registering a sale includes the step of storing the sales information in a server in a network separate from the licensee, and further including the step of communicating the access information over the network.

8. The method of recited in claim 7, wherein the step of communicating access information over the network system includes the step of:

sending a unique user identifier to a client associated with the licensee over the network; and sending a unique password to the client, in which the user identifier and password are used by the licensee to connect to a web application running on a web server separate from the licensee and in which the sales information is stored.

9. The method recited in claim 7, in which the step of sending the access information over the network includes the step of sending a unique product serial number to a client associated with the licensee over the network, in which the product serial number contains a representation of a root domain name associated with the client.

10. The method recited in claim 1, in which the step of generating the key information further includes the step of verifying that the access information matches the sales information.

11. The method recited in claim 1, in which the step of registering the sale of the licensed product includes the steps of:

receiving the sales information over a network at a web application program of a web server separate from the licensee;

in response to receiving the sales information, generating access information based on the sales information using the web application program;

creating a client account in a database of the web server based on the sales information; and storing at least a portion of the access information in the client account.

12. The method recited in claim 11, in which the step of generating access information includes the steps of:

generating a product serial number based on the sales information;

generating a login identifier, wherein the login identifier is used by the licensee to connect to the web application over the network; and storing, as the access information, the product serial number in association with the login identifier.

13. The method of recited in claim 12, in which the step of generating a login identifier includes the steps of:

generating a user identifier that is based on a root domain name of a client associated with the licensee; and generating a password;

wherein a combination of the user identifier and password is used by the client as the login identifier to connect to the web application over the network.

14. The method recited in claim 13, in which the step of generating a product serial number includes the step of generating a product serial number that contains information representing a root domain name associated with the client.

15. The method recited in claim 14, in which the step of generating a product serial number includes the step of generating a product serial number that contains information representing a license characteristic.

16. The method recited in claim 1, wherein the step of receiving a request to activate the licensed product includes the steps of:

receiving a login identifier from a client that is based on the access information;

receiving a product serial number from the client;

when the login identifier is valid, connecting the client to an application program that generates the key information.

17. The method recited in claim 1, wherein the step of generating the key information includes the step of generating an encrypted installation key that contains a representation of information identifying the licensed product.

18. The method recited in claim 1, wherein the step of generating the key information includes the step of generating an encrypted activation key that contains a representation of a license level, in which the license level represents a restriction on allowed users of the licensed product.

19. A computer-readable medium carrying one or more sequences of instructions for regulating use of a licensed product, wherein execution of the one or more sequences of instructions by one or more processors causes the one or more processors to perform the steps of:

registering a sale of the licensed product by storing sales information that uniquely identifies a licensee and the licensed product;

generating access information that uniquely identifies the licensee and the licensed product;

sending, to a remote location that is separate from the licensee, a message that identifies the licensed product and which authorizes the delivery of the licensed product to the licensee;

in response to receiving a request from the licensee to activate the licensed product, in which the request contains the access information, generating key information based on the sales information, wherein the key information comprises information identifying the customer, an installation key and an encrypted activation key;

communicating the installation key and the encrypted activation key to the licensee; and allowing the licensee to access or use the licensed product only after providing the installation key, the encrypted activation key and a portion of the sales information to the licensed product.

20. A method for regulating use of a licensed product, comprising the steps of:

receiving at a licensor of the licensed product, sales information from a distributor of the licensed product, wherein the sales information uniquely identifies a licensee of the licensed product and the licensed product;

generating, at the licensor, a connection identifier value that uniquely identifies the licensee, wherein the connection identifier value is used by the licensee to connect to the licensor;

generating, at the licensor, a unique product identifier value that uniquely identifies the licensed product;

sending the connection identifier value and the unique product identifier value from the licensor to the licensee;

in response to receiving a request from the licensee to activate the licensed product, in which the request contains the connection identifier value and the unique product identifier value, generating an installation key and an encrypted activation key, wherein the installation key and the encrypted activation key can be used to install and activate the licensed product; and sending the installation key and the encrypted activation from the licensor to the licensee, wherein the licensee can install and activate the licensed product only after providing the installation key and the encrypted activation key to the licensed product.

21. A method for regulating use of a licensed product, comprising the steps of:

receiving at a first source, sales information from a second source, wherein the sales information includes an electronic address associated with a third source and information that identifies the licensed product;

generating, at the first source, a unique connection identifier value that uniquely identifies the third source, wherein the connection identifier value is used by the third source to connect to the first source;

generating, at the first source, a unique product identifier value that uniquely identifies the licensed product;

sending the unique connection identifier value and the unique product identifier value from the first source to the third source;

receiving at the first source a first message from the third source, requesting to activate the licensed product, wherein the first message includes the connection identifier value;

receiving at the first source a second message from the third source, wherein the second message includes the unique product identifier value;

in response to receiving the second message from the third source, generating an installation key and an encrypted activation key, wherein the installation key and the encrypted activation key can be used to install and activate the licensed product; and sending the installation key and the encrypted activation from the first source to the third source, wherein the third source is allowed to use the licensed product only after executing an installation program and providing the installation program with the installation key, the encrypted activation key and the electronic address associated with the third source, wherein the third source can install and activate the licensed product only after providing the installation key and the encrypted activation key to the licensed product.

* * * * *